United States Patent [19]

Baney et al.

[11] 4,242,416

[45] Dec. 30, 1980

[54] ORGANOTHIOL-CONTAINING SILOXANE RESINS AS ADHESION PROMOTERS FOR SILOXANE RESINS

[75] Inventors: Ronald H. Baney, Midland; Len A. Harris, Rhodes, both of Mich.

[73] Assignee: Dow Corning Corporation, Midland, Mich.

[21] Appl. No.: 32,989

[22] Filed: Apr. 25, 1979

Related U.S. Application Data

[60] Division of Ser. No. 913,423, Jun. 7, 1978, Pat. No. 4,177,175, which is a continuation-in-part of Ser. No. 863,968, Dec. 23, 1977, abandoned.

[51] Int. Cl.$^3$ .......................... C08J 3/02; C08L 83/04
[52] U.S. Cl. .................................. 428/412; 428/446; 428/447; 428/451; 428/480
[58] Field of Search ............... 428/412, 446, 447, 451, 428/480

[56] References Cited

U.S. PATENT DOCUMENTS 3,986,997  10/1976  Clark ........................... 260/29.1 SN Primary Examiner—Marion McCamish
Attorney, Agent, or Firm—Robert L. McKellar

[57] ABSTRACT

A composition of matter which is an aqueous dispersion of an organothiolsilsesquioxane and colloidal silica is used as an adhesion additive for siloxane resins which have a low degree of substitution.

20 Claims, No Drawings

ORGANOTHIOL-CONTAINING SILOXANE RESINS AS ADHESION PROMOTERS FOR SILOXANE RESINS

This application is a divisional application of application Ser. No. 913,423 filed June 7, 1978 which issued Dec. 4, 1979 as U.S. Pat. No. 4,177,175, which is a continuation-in-part of application Ser. No. 863,968, filed Dec. 23, 1977 and now abandoned.

BACKGROUND OF THE INVENTION

This invention is directed to the discovery that enhanced adhesion and shorter cure times can be achieved in certain siloxane resins which have a low degree of organic substitution.

Just recently, there was disclosed in U.S. Pat. No. 3,986,997, issued Oct. 19, 1976 to Harold A. Clark and assigned to the Dow Corning Corporation a new type of abrasion resistant coating composition which consists of a stable dispersion of colloidal silica and a silicone resin. These coating compositions are unique because they are clear coatings, have generally higher abrasion resistance than most organic materials used for the same purpose and are substantially easier to prepare and handle. These coatings are also easier to apply and for most coating purposes they adhere very well to the substrate they are applied to.

There are other silicone resins which have been utilized to coat various substrates for a variety of purposes and whenever there were desirable properties of these resins that those skilled in the art wished to impart to the substrate, there were always ways to gain the necessary adhesion. For example, silicone resins are used on metal substrates for encapsulation purposes but some metals utilized in electrical systems simply would not adhere to the silicone resins. Some of the common approaches to adhesion in these cases was to prime the metal surface with functional silanes such as

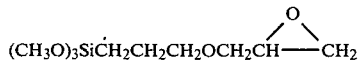

or $(CH_3O)_3SiCH_2CH_2CH_2NHCH_2CH_2NH_2$, allowing an air dry and then applying the resin or, these silanes were added directly to the resin and then the resin was applied to a cleaned metal substrate. Either way, the above noted silanes seemed to provide good adhesion, presumably due to their compatibility in (or with) the silicone resins having a high degree of organic substitution.

When one scans the prior art surrounding the adhesion of silicone resins to various substrates, one continuous thread winds its way through the publications; there is no universal primer or adhesion additive and therefore cautionary statements are always made in those publications that the substrates and the adhesion promoters have to be matched for the best results.

Thus it is not totally unexpected that the ordinary adhesion promoters discussed above would not function well with the siloxane resins having a low degree of organic substitution.

Moreover, when the siloxane resins are being utilized as abrasion resistant coatings, the organosilanes discussed above are not normally utilized because they tend to destroy the hardness of the coating and therefore its effectiveness as an abrasion resistant coating. One specific example of a surface which does not readily adhere to the siloxane resins having a low degree of substitution is polycarbonate. Polycarbonate tends to have inconsistent surface characteristics as it is formed into solid articles and therefore attempts to adhere siloxane resins to such substrates have met with a great deal of difficulty.

What is needed therefore is a means to obtain consistent and uniform adhesion to troublesome substrates so that abrasion resistant siloxane coatings having a low degree of substitution can be adhered to such substrates.

THE INVENTION

The instant invention consists of a composition of matter which is a pigment-free aqueous coating composition comprising a mixture of (A) a dispersion of colloidal silica in lower aliphatic alcohol-water solution of the partial condensate of a silanol of the formula RSi(OH)$_3$, or a dispersion of colloidal silica in ether esters of ethylene or propylene glycol-water solution of the partial condensate of a silanol of the formula RSi(OH)$_3$, in which R is selected from the group consisting of alkyl radicals of 1 to 3 inclusive carbon atoms, the vinyl radical, the 3,3,3-trifluoropropyl radical, the gamma-glycidoxypropyl radical, the gamma-methacryloxypropyl radical and the phenyl radical, at least 70 weight percent of the silanol being CH$_3$Si(OH)$_3$, said compositon containing 10 to 50 weight percent solids consisting essentially of 10 to 70 weight percent colloidal silica and 30 to 90 weight percent of the partial condensate, said composition containing sufficient acid to provide a pH in the range of 2.5 to 6.0, having added thereto sufficient (B) to give 1–5 weight percent of the solids of (B) based on the weight of the total solids of (A) and (B) in the composition wherein (B) is an aqueous composition comprising a dispersion of colloidal silica in lower aliphatic alcohol-water solution of a partial condensate of a silanol of the formula R'Si(OH)$_3$, or a dispersion of colloidal silica in ether esters of ethylene or propylene glycol-water solution of a partial condensate of a silanol of the formula R'Si(OH)$_3$ in which R' is selected from HSR"— and (HS)$_2$R"— wherein R" is selected from a group consisting of a divalent or trivalent aliphatic hydrocarbon radical having 1–6 carbon atoms and phenylene the colloidal silica in (B) being present in the amount of 34 to 50 weight percent and the amount of the partial condensate of a silanol present in (B) being 50 to 66 weight percent both based on the total weight of solids contained in (B), said composition (B) containing 10 to 50 weight percent solids, said composition (B) containing sufficient acid to provide a pH in the range of 2.8 to 5.2 until it is added to composition (A).

As will be evident to those skilled in the art, component (A) of the inventive composition is a known material and the preparation and handling of such materials can be found in U.S. Pat. No. 3,986,997 referred to above which patent is hereby incorporated by reference and forms part of this invention.

The second component (B) is the critical part of this invention. It is this component, and the manner in which it is used with component (A), that gives the novelty to this invention.

Component (B) is an aqueous composition comprising either a dispersion of colloidal silica in lower aliphatic alcohol-water solution of a partial condensate of a silanol of the formula R'Si(OH)$_3$, or a dispersion of colloidal silica in ether esters of ethylene or propylene glycol-water solution of a partial condensate of a silanol of the formula R'Si(OH)$_3$ in which R' is selected from HSR"— and (HS)$_2$R"— wherein R" is selected from a group consisting of a divalent aliphatic hydrocarbon radical having 1-6 carbon atoms and phenylene.

Component (B) is prepared essentially in the same manner as is component (A). The difference between the two materials is that the partial condensate of (A) is primarily CH$_3$Si(OH)$_3$ while the partial condensate of (B) is derived from a mercaptofunctional substituted silanol. Thus, the partial condensate of (B) is represented by the general formula R'Si(OH)$_3$ in which R' represents (HS)$_2$R"— and HSR"—. R" in this case is selected from divalent or trivalent aliphatic hydrocarbon radicals of 1-6 carbon atoms and the phenylene radical.

Thus, R" can be, for example, =CH—CH$_2$CH$_2$, —CH$_2$—, —CH$_2$CH$_2$CH$_2$—, —(CH$_2$)$_4$, —CH$_2$)$_6$ or more specifically,

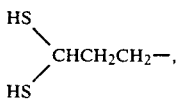

HSCH$_2$— and HSCH$_2$CH$_2$CH$_2$—.

The partial condensate constitutes only a portion of the solids in component (B). The other essential ingredient is colloidal silica.

Just as in component (A) above, aqueous colloidal silica dispersions having a particle size in the range of 5-150 millimicrons in diameter are required. These silica dispersions are prepared by methods well-known in the art and are commercially available under such registered trademarks as "Ludox" and "Nalcoag". It is preferred to use colloidal silica of 10-30 m$\mu$ particle size. Colloidal silicas of this type are relatively free of Na$_2$O and other alkali metal oxides, generally containing less than 2 weight percent, preferably less than 1 weight percent Na$_2$O. They are available as both acidic and basic hydrosols. Colloidal silica is distinguished from other water dispersable forms of SiO$_2$, such as nonparticulate polysilicic acid or alkali metal silicate solutions, which are not operative in the practice of the present invention.

The silica is dispersed in a solution of the siloxanol carried in a lower aliphatic alcohol-water cosolvent or in an ether ester of ethylene or propylene glycol-water cosolvent. Suitable lower aliphatic alcohols include methanol, ethanol, isopropanol, and t-butyl alcohol. Mixtures of such alcohols can be used. Isopropanol is the preferred alcohol and when mixtures of alcohols are utilized it is preferred to utilize at least 50 weight percent of isopropanol in the mixture to obtain optimum adhesion of the coating. The solvent system should contain from about 20 to 75 weight percent alcohol to ensure solubility of the siloxanol. Suitable ether esters of ethylene or propylene glycol are the well-known low molecular weight solvents such as carbitol acetate i.e. CH$_3$COO(CH$_2$CH$_2$O)$_2$C$_2$H$_5$, CH$_3$COO(CH$_2$CH$_2$O)$_2$C$_4$H$_9$ and Cellosolve Acetate ® i.e. CH$_3$COOCH$_2$CH$_2$OC$_2$H$_5$ and such materials as CH$_3$COOCH$_2$CH$_2$OCH$_3$ and CH$_3$COOCH$_2$CH$_2$OC$_4$H$_9$ and analogs of such materials prepared from propylene glycol. This solvent system should also contain from 20-75 weight percent of the ether esters to ensure solubility of the siloxanol. Optionally one can utilize an additional water-miscible polar solvent, such as acetone, butyl cellosolve and the like in a minor amount, for example no more than 20 weight percent of the cosolvent system.

To obtain optimum properties in the coating and to prevent immediate gellation of the coating composition, sufficient acid to provide a pH of 2.5 to 6.0 must be present. Suitable acids include both organic and inorganic acids such as hydrochloric, acetic, chloroacetic, citric, benzoic, dimethylmalonic, formic, glutaric, glycolic, maleic, malonic, toluene-sulfonic, oxalic and the like. The specific acid utilized has a direct effect on the rate of silanol condensation which in turn determines shelf life of the composition. The stronger acids, such as hydrochloric and toluenesulfonic acid, give appreciably shortened shelf or bath life and require less aging to obtain the described soluble partial condensate. It is preferred to add sufficient water-miscible carboxylic acid selected from the group consisting of acetic, formic, propionic and maleic acids to provide pH in the range of 4 to 5.5 in the coating composition. In addition to providing good bath life, the alkali metal salts of these acids are soluble, thus allowing the use of these acids with silicas containing a substantial (greater than 0.2% Na$_2$O) amount of alkali metal or metal oxide.

The composition (B) is easily prepared by adding the trialkoxysilane, such as R'Si(OCH$_3$)$_3$, to colloidal silica hydrosols and adjusting the pH to the desired level by addition of the organic acid. The acid can be added to either the silane or the hydrosol prior to mixing the two components provided that the mixing is done rapidly. The amount of acid necessary to obtain the desired pH will depend on the alkali metal content of the silica but is usually less than one weight percent of the composition. Alcohol is generated by hydrolysis of the alkoxy substituents of the silane, for example, hydrolysis of one mole of —Si(OC$_2$H$_5$)$_3$ generates 3 moles of ethanol. Depending upon the percent solids desired in the final composition, additional alcohol, water or a water-miscible solvent can be added. The composition should be well mixed and allowed to age for a short period of time to ensure formation of the partial condensate. The composition thus obtained is a clear or slightly hazy low viscosity fluid which is stable for several days.

It is desirable to have in component (B) 34–50 weight percent of colloidal silica and 50–66 weight percent of the partial condensate of R'Si(OH)$_3$, based on the weight of the colloidal silica and the partial condensate of R'Si(OH)$_3$ in (B). Component (B) is used as a 10–50 weight percent solids aqueous dispersion.

The coating composition formed by (A) and (B) is prepared by simply mixing components (A) and (B) together in such a ratio that there is present in the composition from 1–5 weight percent of the solids of (B) based on the weight of the solids in (A) and (B).

Buffered latent condensation catalysts can be added to the composition so that milder curing conditions can be utilized to obtain the optimum abrasion resistance and abrasion in the final coating. Alkali metal salts of carboxylic acids, such as potassium formate, are one class of such latent catalysts. The amine carboxylates and quaternary ammonium carboxylates are another such class of latent catalysts. Of course the catalysts must be soluble or at least miscible in the cosolvent system. The catalysts are latent to the extent that at room temperature they do not appreciably shorten the bath life of the composition, but upon heating the catalysts dissociates and generates a catalytic species active to promote condensation. Buffered catalysts are used to avoid effects on the pH of the composition. Certain of the commercially available colloidal silica dispersions contain free alkali metal base which reacts with the organic acid during the adjustment of pH to generate the carboxylate catalysts in situ. This is particularly true when starting with a hydrosol having a pH of 8 or 9. The compositions can be catalyzed by addition of carboxylates such as dimethylamine acetate, ethanolamine acetate, dimethylaniline formate, tetraethylammonium benzoate, sodium acetate, sodium propionate, sodium formate or benzyltrimethylammonium acetate. The amount of catalyst can be varied depending upon the desired curing condition, but at about 1.5 weight percent catalyst in the composition, the bath life is shortened and optical properties of the coating may be impaired. It is preferred to utilize from about 0.05 to 1 weight percent of the catalyst.

To provide the greatest stability in the dispersion form while obtaining optimum properties in the cured coating, it is preferred to utilize a coating composition having a pH in the range of 4–5 which contains 10–35 weight percent solids; the silica portion having a particle size in the range of 5–30 millimicrons, the partial condensate from (A) and (B) being present in an amount in the range of 35 to 55 weight percent of the total solids in a cosolvent of methanol, isopropanol and water, the alcohols representing from 30 to 60 weight percent of the cosolvent and a catalyst selected from the group consisting of sodium acetate and benzyltrimethylammonium acetate being present in an amount in the range of 0.05 to 0.5 weight percent of the composition. Such a composition is relatively stable and, when coated onto a substrate, can be cured in a relatively short time at temperatures in the range of 75°–125° C. to provide a transparent abrasion resistant adherent surface coating.

The coating compositions of the invention can be applied to solid substrates by conventional methods, such as flowing, spraying or dipping to form a continuous surface film. Although substrates of soft plastic sheet material show the greatest improvement upon application of the coating, the composition can be applied to other substrates, such as wood, metal, printed surfaces, leather, glass, ceramics and textiles. The compositions are especially useful as coatings for dimensionally stable synthetic organic polymeric substrates in sheet or film form, such as acrylic polymers, for example poly(methylmethacrylate), polyesters, for example poly(ethyleneterephthalate) and polycarbonates, such as poly(diphenylolpropane)carbonate and poly(diethylene glycol bis allyl)carbonate, polyamides, polyimides, copolymers of acrylonitrile-styrene, styrene-acrylonitrile-butadiene copolymers, polyvinyl chloride, butyrates, polyethylene and the like. Transparent polymeric materials coated with these compositions are useful as flat or curved enclosures, such as windows, skylights and windshields, especially for transportation equipment. Plastic lenses, such as acrylic or polycarbonate ophthalmic lenses, can be coated with the compositions of the invention. In certain applications requiring high optical resolution, it may be desirable to filter the coating composition prior to applying it to the substrate. In other applications, such as corrosion-resistant coatings on metals, the slight haziness (less than 5%) obtained by the use of certain formulations, such as those containing citric acid and sodium citrate, is not detrimental and filtration is not necessary.

By choice of proper formulation, including solvent, application conditions and pretreatment of the substrate, the coatings can be adhered to substantially all solid surfaces. A hard solvent-resistant surface coating is obtained by removal of the solvent and volatile materials. The composition will air dry to a tack-free condition, but heating in the range of 50° to 150° C. is necessary to obtain condensation of residual silanols in the partial condensate. This final cure results in the formation of silsesquioxanes of the formula $RSiO_{3/2}$ and $R'SiO_{3/2}$ and greatly enhance the abrasion resistance and adhesion of the coating. The coating thickness can be varied by means of the particular application technique, but coatings of about 0.5 to 20 micron preferably 2–10 micron thickness are generally utilized. Especially thin coatings can be obtained by spin coating.

Now, the following examples are offered so that those skilled in the art can better understand and appreciate this invention.

EXAMPLE 1

Preparation of Component (A)

A mixture of 10.5 grams of glacial acetic acid and 304.5 grams of methyltrimethoxysilane was slowly added to 444.1 grams of a commercially available aqueous dispersion of colloidal silica having an initial pH of 3.1 containing approximately 34% $SiO_2$ of approximately 22 millimicron particle size and having an $Na_2O$ content of less than 0.01 weight percent. The acidified dispersion was stirred while it was slightly cooled by an external ice bath to keep the temperature below about 10° C. The dispersion was stirred for about 1 hour beyond the end of the full addition of the silane while generating methanol and methyltrisilanol. Upon standing for a while, the pH stabilized at 4.5 and the material was stripped to approximately 60 percent solids and diluted to 35 percent solids using alcohol.

EXAMPLE 2

Preparation of Component (B) (50 weight percent $HSCH_2CH_2CH_2Si(OH)_3$ and 50 weight percent $SiO_2$)

A solution (142.9 grams) of 48.6 grams of the same colloidal silica as was used in Example 1, 94.3 grams of water and 10 grams of glacial acetic acid was placed in a glass reaction flask and there was added thereto 77.2 grams of mercaptopropyltrimethoxysilane with moderate stirring to produce a hydrolyzate containing $HSCH_2CH_2CH_2Si(OH)_3$. 134.6 grams of isopropanol was added, the mixture stirred and then stripped to 48.2% solids and then rediluted with alcohol to 35 percent solids.

EXAMPLE 3

Component (A) from Example 1 was further diluted to 22.5 weight percent solids using alcohol.

Various quantities of component (B) were then added to component (A) so as to give 5 weight percent of the solids of component (B) based on the total solids content of (A) and (B), in the coating composition.

In the following data where Δ haze values appear, it can be assumed that the adhesion of the coating in that example is 100% as measured by the ⅛" crosshatch tape pull test.

The data was gathered on clear Lexan polycarbonate panels manufactured by the General Electric Plastics Division, Pittsfield, Mass.

Prior to coating the test panels were cleaned in the following manner. The panels were washed with isopropanol and then hexane and then rubbed gently with a dust free cloth containing heptane. The panels were then rinsed with isopropanol, air dryed and heated at 125° C. for 2 hours, allowed to cool to room temperature and then coated immediately.

The panels measured 4"×4"×⅛" thick and were flow coated with the material from Example 2 at 22.5 weight percent solids to give a thin coating of 3 microns thickness.

The abrasion resistance was measured according to ASTM Method D1044-56 using a 500 gm test load and CS-10F abrasive wheel for 500 resolutions. The percent change in haze from an unabraded surface to an abraded surface is reported. Haze is defined as that percentage of transmitted light which in passing through the specimen deviates from the incident beam by forward scattering according to ASTM Method D1003-61. A Hunter Haze Meter, Gardner Laboratory, Inc. was used.

To determine haze, the amount of diffused light is measured, divided by the amount of transmitted light and multiplied by 100. NA indicates no adhesion.

| Results Cure Time hours | 5% Additive Level Relative Humidity 65%/Cure 125° C. Air dry time after coating - hours | | |
| --- | --- | --- | --- |
| | ½ | 1½ | 3 |
| ½ | NA | NA | NA |
| 1½ | 0.7% | 1.0% | 3.0% |
| 3 | 1.5% | 2.5% | 2.8% |

| Cure Time hours | 0% Additive Level* Relative Humidity 65%/Cure 125° C. Air time after coating - hours | | |
| --- | --- | --- | --- |
| | ½ | 1½ | 3 |
| ½ | NA | NA | NA |
| 1½ | NA | NA | NA |
| 3 | NA | NA | NA |

*0% additive level in component (A) without component (B).

| Cure Time hours | 5% Additive Level Relative Humidity 35%/Cure 125° C. Air dry time after coating - hours | | |
| --- | --- | --- | --- |
| | ½ | 1½ | 3 |
| ½ | NA | NA | 0.8% |
| 1½ | 0.4% | 1.0% | 1.6% |
| 3 | 1.5% | 1.2% | — |

| Cure Time hours | 0% Additive Level Relative Humidity 35%/Cure 125° C. Air dry time after coating - hours | | |
| --- | --- | --- | --- |
| | ½ | 1½ | 3 |
| ½ | NA | NA | NA |
| 1½ | NA | NA | NA |
| 3 | NA | NA | NA |

This data shows that enhanced adhesiveness is obtained by the use of this invention and that the incorporation of the component (B) in component (A) shortens the cure time of component (A).

EXAMPLE 4

Further abrasion tests were run on the above coating composition to show that the addition of component (B) to component (A) did not significantly detract from the abrasion resistant qualities and that the abrasion resistance on the inventive composition is more prolonged than component (A) without component (B).

| # Cycles | Cured (X) hours @ 125° C. % Δ Haze | | |
| --- | --- | --- | --- |
| | 1% HS/16 hr. | 1% HS/5 hr. | 0% HS/5 hr. |
| 500 | 0.9 | 1.2 | 1.4 |
| 1000 | 2.2 | 2.0 | 2.9 |
| 1500 | 2.6 | 3.0 | 5.1 |
| 2000 | 3.2 | 4.7 | 6.5 |
| 2500 | 3.5 | | |
| 3000 | 4.5 | | |

Note that the additive level is 1% and not 5% as in the previous example. Note also that this data was generated on panels which were handled and coated the same as in the previous example.

EXAMPLE 5

This example illustrates the use of ether esters of ethylene, and water, as a co-solvent.

Methyltrimethoxysilane, 214 gms. was slowly added to a mixture of 309 gms. of the same type of colloidal silica as was used in Example 1 and 10.5 gms. of glacial acetic acid at a temperature of about 8° C. The mixture was stirred and cooled to maintain the temperature at about 8° C. The reaction mass was then stripped under vacuum to remove some volatiles until there remained 430 gms. of material. This hydrolyzate, 215 gms. at 46.6% solids was then treated with 7.5 gms. of mercaptopropyltrimethoxysilane and 195 gms. of cellosolve acetate. The material at this point was stirred to make homogeneous and clear. It contained about 35 weight percent solids. The coating when cured gave a clear coating having a pencil hardness of 6H.

That which is claimed is:

1. An article comprising a solid substrate coated with a pigment-free coating composition which is a composition comprising a mixture of (A) a dispersion of colloidal silica in lower aliphatic alcohol-water solution of the partial condensate of a silanol of the formula RSi(OH)$_3$ or a dispersion of colloidal silica in ether esters of ethylene or propylene glycol-water solution, of the partial condensate of a silanol of the formula RSi(OH)$_3$ in which R is selected from the group consisting of alkyl radicals of 1 to 3 inclusive carbon atoms, the vinyl radical, the 3,3,3-trifluoropropyl radical, the gamma-glycidoxypropyl radical, the gamma-methacryloxypropyl radical and the phenyl radical, at least 70 weight percent of the silanol being CH$_3$Si(OH)$_3$, said composition containing 10 to 50 weight percent solids consisting essentially of 10 to 70 weight percent colloidal silica and 30 to 90 weight percent of the partial condensate, said composition containing sufficient acid to provide a pH in the range of 2.5 to 6.0, having added thereto sufficient (B) to give 1–5 weight percent of the solids of (B) based on the weight of the total solids of (A) and (B) in the composition wherein (B) is an aqueous composition comprising a dispersion of colloidal silica in lower aliphatic alcohol-water solution of a partial condensate of a silanol of the formula R'Si(OH)$_3$ or a dispersion of colloidal silica in ether esters of ethylene or propylene glycol-water solution of a partial condensate of a silanol of the formula R'Si(OH)$_3$ in which R' is selected from HSR"— and (HS)$_2$R"— wherein R" is selected from a group consisting of a divalent or trivalent aliphatic hydrocarbon radical having 1–6 carbon atoms and phenylene, the colloidal silica in (B) being present in the amount of 34 to 50 weight percent and the amount of R'Si(OH)$_3$ present in (B) being 50 to 66 weight percent both being based on the total weight of solids contained in (B), said composition (B) containing 10 to 50 weight percent solids, said composition (B) containing sufficient acid to provide a pH in the range of 2.8 to 5.2 until it is added to composition (A).

2. An article in accordance with claim 1 where in the coating composition, the acid is a water-miscible organic acid selected from the group consisting of acetic, formic, propanoic and maleic acid.

3. An article in accordance with claim 2 wherein the coating composition contains from about 0.05 to 1.5 weight percent of a buffered latent silanol condensation catalyst.

4. An article in accordance with claim 3 wherein said solid substrate is transparent.

5. An article in accordance with claim 4 wherein said solid substrate is acrylic polymer.

6. An article in accordance with claim 4 wherein said solid substrate is polyester.

7. An article in accordance with claim 6 wherein the polyester is poly(diphenylol propane)carbonate.

8. An article in accordance with claim 6 wherein the polyester is poly(diethylene glycol bis allyl)carbonate.

9. An article in accordance with claim 8 wherein the lens is an ophthalmic lens.

10. An article in accordance with claim 4 in the form of a lens.

11. An article of claim 1 in which the alcohol in the coating composition is present in an amount in the range of 20 to 75 weight percent based on the total weight of the cosolvent.

12. An article in accordance with claim 11 where in the coating composition, the acid is a water-miscible organic acid selected from the group consisting of acetic, formic, propanoic and maleic acid.

13. An article in accordance with claim 12 wherein the coating composition contains from about 0.05 to 1.5 weight percent of a buffered latent silanol condensation catalyst.

14. An article in accordance with claim 13 wherein said solid substrate is transparent.

15. An article in accordance with claim 14 wherein said solid substrate is acrylic polymer.

16. An article in accordance with claim 14 wherein said solid substrate is polyester.

17. An article in accordance with claim 16 wherein the polyester is poly(diphenylol propane)carbonate.

18. An article in accordance with claim 16 wherein the polyester is poly(diethylene glycol bis allyl)carbonate.

19. An article in accordance with claim 18 wherein the lens is an ophthalmic lens.

20. An article in accordance with claim 14 in the form of a lens.

* * * * *

UNITED STATES PATENT AND TRADEMARK OFFICE
CERTIFICATE OF CORRECTION

PATENT NO. : 4,242,416
DATED : December 30, 1980
INVENTOR(S) : Ronald H. Baney; Len A. Harris It is certified that error appears in the above-identified patent and that said Letters Patent are hereby corrected as shown below:

In Column 3, line 17; the line reading "-$CH_2$-, -$CH_2CH_2CH_2$-, -$(CH_2)_4$, -$CH_2)_6$ or" should read "-$CH_2$-, -$CH_2CH_2CH_2$-, -$(CH_2)_4$, $(CH_2)_6$ or".

In Column 7, line 24; the word "Results" should read "Results:".

In Column 7, line 34; the heading reading

"        0% Additive Level*
 Relative Humidity 65%/Cure 125°C.
     Air time after coating - hours"

should read

"        0% Additive Level*
 Relative Humidity 65%/Cure 125°C.
   Air dry time after coating - hours "

Signed and Sealed this

Eighth Day of September 1981

[SEAL]

Attest:

GERALD J. MOSSINGHOFF

Attesting Officer     Commissioner of Patents and Trademarks